(12) United States Patent
Wolf-Monheim

(10) Patent No.: US 10,870,324 B2
(45) Date of Patent: Dec. 22, 2020

(54) VEHICLE SUSPENSION HAVING A LEAF SPRING AND A CONTROL ARM JOINED BY ELASTOMER CONNECTOR

(71) Applicant: FORD GLOBAL TECHNOLOGIES, LLC, Dearborn, MI (US)

(72) Inventor: Friedrich Peter Wolf-Monheim, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 141 days.

(21) Appl. No.: 16/246,487

(22) Filed: Jan. 12, 2019

(65) Prior Publication Data
US 2019/0217677 A1 Jul. 18, 2019

(30) Foreign Application Priority Data
Jan. 12, 2018 (DE) .................. 10 2018 200 459

(51) Int. Cl.
*B60G 11/42* (2006.01)
*F16F 1/00* (2006.01)
(Continued)

(52) U.S. Cl.
CPC .............. *B60G 11/42* (2013.01); *B60G 3/06* (2013.01); *B60G 7/02* (2013.01); *B60G 11/02* (2013.01); *B60G 11/12* (2013.01); *F16F 1/00* (2013.01); *F16F 1/26* (2013.01); *B60G 2200/142* (2013.01); *B60G 2202/11* (2013.01); *B60G 2204/121* (2013.01); *B60G 2204/143* (2013.01); *B60G 2206/10* (2013.01); *B60G 2206/73* (2013.01); *B60G 2800/162* (2013.01)

(58) Field of Classification Search
CPC ......... B60G 11/42; B60G 11/12; B60G 11/02; B60G 3/06; B60G 7/02; B60G 2202/11; B60G 2200/142; B60G 2204/121; B60G 2204/143; B60G 2206/10; B60G 2206/73; B60G 2800/162; B60G 11/08; B60G 2202/114; F16F 1/26
See application file for complete search history.

(56) References Cited

U.S. PATENT DOCUMENTS 2,063,216 A * 12/1936 Zaparka ................ B60G 11/34
267/30
4,022,449 A * 5/1977 Estorff ....................... F16F 1/18
267/48

(Continued)

FOREIGN PATENT DOCUMENTS

CN 102887042 B 1/2013

*Primary Examiner* — Frank B Vanaman
(74) *Attorney, Agent, or Firm* — Raymond L. Coppiellie; Brooks Kushman P.C.

(57) ABSTRACT

A motor vehicle suspension having a leaf spring, a control, and a connector formed of a monolithic piece of elastomer. The connector has a blind-hole cavity receiving an end of the leaf spring and a through-hole cavity through which the control arm extends. The connector is bonded to the leaf spring and to the control arm by vulcanization. The control arm has at least one hole formed through a flat connection portion thereof, and the connector extends through the at least one hole. At least one stiffener plate is embedded in the connector and is arranged substantially parallel to the flat connection portion of the control arm received by the through-hole cavity.

14 Claims, 3 Drawing Sheets

(51) Int. Cl.
    *B60G 11/12*     (2006.01)
    *B60G 11/02*     (2006.01)
    *F16F 1/26*     (2006.01)
    *B60G 3/06*     (2006.01)
    *B60G 7/02*     (2006.01)

(56) References Cited

U.S. PATENT DOCUMENTS

| | | | |
|---|---|---|---|
| 4,416,203 A * | 11/1983 | Sherrick | B61F 5/305 |
| | | | 105/224.1 |
| 4,768,807 A * | 9/1988 | McGibbon | B60G 11/08 |
| | | | 267/269 |
| 4,772,044 A * | 9/1988 | Booher | B29C 70/52 |
| | | | 267/149 |
| 4,997,202 A * | 3/1991 | Kitagawa | B60G 17/0275 |
| | | | 280/124.14 |
| 5,251,930 A * | 10/1993 | Kusaka | B60G 11/08 |
| | | | 267/260 |
| 5,826,896 A * | 10/1998 | Baumann | B60G 11/10 |
| | | | 280/124.171 |
| 5,942,205 A | 8/1999 | Murata et al. | |
| 8,777,248 B2 | 7/2014 | Perri et al. | |
| 9,278,596 B2 | 3/2016 | Hummelt et al. | |
| 2004/0262877 A1 * | 12/2004 | Sellers | B60G 9/00 |
| | | | 280/124.165 |
| 2009/0115157 A1 | 5/2009 | Platner et al. | |
| 2011/0057409 A1 * | 3/2011 | Leeder | B60G 11/10 |
| | | | 280/124.175 |
| 2017/0008359 A1 | 1/2017 | Wolf-Monheim | |
| 2017/0113504 A1 * | 4/2017 | Drabon | B60G 11/08 |

\* cited by examiner

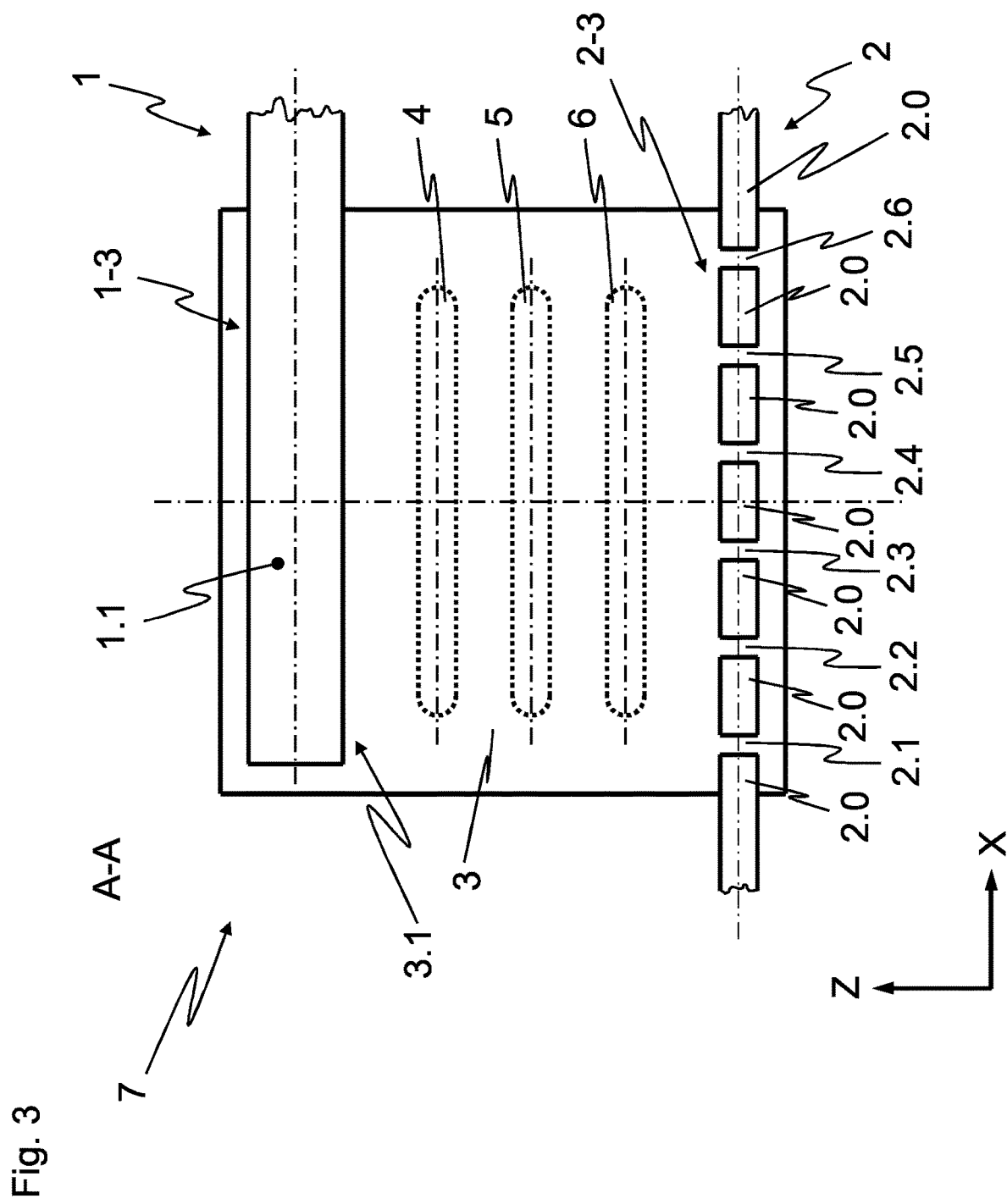

VEHICLE SUSPENSION HAVING A LEAF SPRING AND A CONTROL ARM JOINED BY ELASTOMER CONNECTOR

CROSS-REFERENCE TO RELATED APPLICATIONS

This application claims foreign priority benefits under 35 U.S.C. § 119(a)-(d) to DE Application 10 2018 200 459.5 filed Jan. 12, 2018, which is hereby incorporated by reference in its entirety.

TECHNICAL FIELD

The present invention relates to a connection arrangement for a suspension for mounting a wheel to a vehicle. The invention furthermore relates to a method for producing a connection arrangement or for mounting a connection between a leaf spring and a control arm.

BACKGROUND

In the case of vehicles, as also in the case of motor vehicles, the components of the wheel suspension can account for up to a fifth of the total vehicle weight. At the same time, the individual components and component groups must be precisely matched to one another in order to ensure optimum functioning of the complete chassis. Two components of such a wheel suspension include a vehicle spring and what is known as a control arm, wherein, depending on the installation direction, it is possible to differentiate between longitudinal, transverse and composite control arms.

Coil springs which are supported, for example, on one hand, on the control arm or on the wheel carrier attached thereto and, on the other hand, on the vehicle sprung structure represent a widely-used design for vehicle springs. In addition to this, however, leaf springs are also used which are connected, for example, at one or two points to the sprung vehicle structure and at a further point to the control arm or the wheel carrier. Leaf springs composed of steel, but increasingly also from composite materials, are favored chassis components as a result of their cost- and weight-efficiency as well as their robustness. In order to enable optimum integration into a suspension system, the interfaces to adjacent suspension components are particularly relevant. In addition to an efficient, robust and long-lasting design, costs and weight of the interface components should be minimized. The connection to adjacent control arms is of central importance here.

The control arms normally connect the wheel carrier to a vehicle sprung structure and take on both the wheel-guidance tasks as well as frequently the transmission of spring, damping and stabilizer forces. They are typically produced from steel (e.g. forged, cast, punched, milled) or from aluminum (e.g. forged or by means of die casting). In particular, control arms can also be manufactured as sheet formed parts, for example, in one-shell or two-shell design. From the aspect of weight saving, transverse control arms composed of fibrous composite materials have also been developed, in the case of which fibers of various types, for example, carbon fibers, glass fibers or aramid fibers, are incorporated into a plastic matrix. Two-, three- or four-point control arms are used in accordance with the constructive requirements. The number of points relates to the connection points which a control arm possesses. Control arms are furthermore formed typically to be flat, i.e. with shear pads.

From the prior art, U.S. Pat. No. 8,777,248 B2 discloses a motor vehicle wheel suspension system which has at least one transverse control arm for each wheel. Each transverse control arm has a fork-like portion, wherein a leaf spring is pushed in a positive-locking manner centrally between the struts of the fork-like portion. Inlays, for example, a thin layer composed of a material with a low coefficient of friction, such as PTFE, are arranged between the surfaces of the transverse control arm and the leaf spring in order to enable small displacements in the longitudinal extent of the leaf spring. The mounting connection between each end of the leaf spring and the fork-like portion of the respective transverse control arm is secured by a screw.

U.S. Pat. No. 9,278,596 B2 discloses a transverse leaf spring which takes on wheel-guiding functions, control arm functions as well as damping and load-bearing tasks in order to replace the helical springs or also stabilizers required in a conventional wheel suspension. The transverse leaf spring is received in its respective end portions by means of an adapter in a holder. In this case, it can be provided, among other things, to connect an upper adapter portion to an upper damping body and a lower adapter portion to a lower damping body, wherein the connection is realized by vulcanizing on so that the respective adapter portions with the associated damping bodies form a one-piece component.

CN 102887042 B describes a leaf spring which is coupled to control arms via a connection piece of a layer-like structure and which is composed of vulcanized plastic or rubber plates and pushed-in clamping plates. The coupling between leaf spring and connection piece or between control arm and connection piece is performed via screw connections.

A suspension arrangement which comprises several leaf springs composed of composite material is known, for example, from US 2009/0115157 A1. Herein, the leaf springs have in each case a contact element formed as an elastic block which is produced from an elastomer material, for example, rubber. The elastic block is mounted in a sliding-displaceable manner in a holder which is in turn connected to the vehicle body.

U.S. Pat. No. 6,942,205 B2 relates to bushings which are of a layer-like structure and which are used as a component of a leaf spring arrangement. The bushings are formed with a layer composed of metal and a layer composed of an elastic material, for example, rubber by means of winding, the elastic layer being pressed in a spiral form between the metal layer. Alternatively, the elastic layer, after formation of the bushings, is connected by vulcanization to the metal layer.

DE 10 2015 212 743 A1 relates to a wheel suspension with a transverse control arm which comprises a control arm portion which is produced at least partially from fiber-reinforced plastic and which in turn comprises an inherently elastic spring portion, this spring portion having a spring attachment point for elastic attachment to the vehicle structure.

In view of the highlighted prior art, there is still room for improvement in terms of the connection between a leaf spring and in particular the shear pads of a control arm. It is desirable to provide an improved connection arrangement and achieve a resistant, durable, lightweight and low-cost design. It is furthermore desirable to provide a production or mounting method for such a connection arrangement.

SUMMARY

It should be pointed out that the features and measures listed individually in the following description can be combined with one another in any desired, technically expedient manner and highlight further configurations of the invention. The description characterizes and specifies the invention in particular additionally in conjunction with the figures.

Disclosed herein is a connection arrangement for a sprung wheel suspension of a motor vehicle with at least one leaf spring for the suspension of the vehicle and a control arm. The connection arrangement has a leaf spring connection portion, one or more flat control arm connection portions arranged on the control arm, for example, a shear pad of a control arm, and a connection piece with a leaf spring contact region for receiving the leaf spring connection portion as well as with a control arm contact region for receiving the control arm connection portion. The connector further encloses and/or engages around the leaf spring connection portion and/or the one or more control arm connection portions entirely or partially in a positive-locking manner. The control arm can, depending on the desired application, comprise one or more transverse control arms, longitudinal control arms or composite control arms. The leaf spring connection portion is, for example, but not necessarily, arranged at a longitudinal end or in the region of the longitudinal end of the leaf spring.

In particular vulcanized (e.g. rubber or other elastomer) and/or vulcanizable materials are possible for the connector. However, other plastic and/or composite materials can also be used in so far as the necessary material properties are present. The control arm connection portion is arranged at or in the region of the shear pad which is formed to be substantially flat. A lightweight, robust and low-cost connection arrangement between leaf spring and control arm can be realized by the configuration according to the invention of the connection.

In one advantageous disclosed embodiment, the connector is formed in one piece for connecting and/or coupling the leaf spring connection portion to the one and/or more control arm connection portions. The same connector thus encloses and/or engages around both the leaf spring connection portion and at least one control arm connection portion at least partially in a positive-locking manner. As a result of the one-piece embodiment, on one hand, method steps in a production and mounting method can be dispensed with. On the other hand, the connector becomes more stable and thus more robust/resistant, i.e. more durable, by avoiding joining surfaces and/or additional connection elements such as screws.

In the context of an optional further development of the invention, the flat leaf spring contact region formed between the leaf spring connection portion and the connector and/or the control arm contact region formed between the control arm connection portion(s) and the connector is formed entirely or in sub-regions as a non-detachable connection, in particular an adhesive adhesion connection, i.e. in a firmly bonded manner, to the connector. The term "non-detachable connection" refers here to the fact that it cannot be detached in a re-attachable or destruction-free manner, thus screw or plug-in connections are not covered by it. This non-re-attachable connection is typically realized between two different materials, for example as an elastomer/metal connection. A vulcanized bonding of the component is particularly advantageous. Vulcanized bonding of rubber (or other elastomer) to metal is a term understood by persons of skill in the art to generically identify the process by which an elastomer is chemically bonded to a steel surface. Moreover, the surfaces of the leaf spring contact region and/or of the control arm contact region may be pretreated or coated by means of physical and/or chemical methods in order to form an adhesive connection during vulcanization or during subsequent mounting. As a result of this, the required stability can be adjusted in accordance with the loads to be expected.

It is particularly advantageous if the connector has a blind hole-type cavity, the inner wall of which forms a leaf spring contact surface disposed within the leaf spring contact region with a terminal leaf spring connection portion, i.e. disposed at the leaf spring longitudinal end or in the region of the leaf spring longitudinal end, or is suitable for the formation of the leaf spring contact surface with said terminal leaf spring connection portion. The geometrical configuration of the inner wall of this cavity is adapted to the outer form, which is to be enclosed and/or surrounded, of the leaf spring connection portion, in particular in a complementary manner to it. Alternatively to this, the cavity can also be formed as a through bore. As a result of the blind hole-type configuration of the cavity, final mounting after the end of the vulcanization process is conceivable. Further alternatively or additionally, the leaf spring connection portion can have cavities and/or through holes, through which the connector penetrates, in particular after the end of a vulcanization process.

The control arm and/or the one or more control arm connection portions have, in a further advantageous embodiment, one or more through holes through which the connector penetrates entirely or partially. As a result of this, both a positive-locking and a non-positive connection is and/or can also be realized between the control arm and the connector.

In an optional further development of the connection arrangement, the connector additionally comprises one or more stiffeners which may advantageously be formed as metal plates in order to increase the stiffness of the connector.

The one or more stiffeners can be fully enclosed and/or surrounded by the connector. As a result of this, the stiffeners are shielded from undesirable mechanical influences and/or corrosive environmental conditions. The stiffeners are in particular enclosed and/or surrounded fully and at the same time in a positive-locking manner.

In one preferred embodiment, at least two stiffeners are formed as flat metal plates, the flat side walls of which are disposed substantially parallel to one another and/or substantially parallel to the flat control arm connection portion. This can lead to an increase in stiffness in a direction perpendicular to the surface of the side walls of the metal plate. In particular, the stiffness ratio between the stiffness in the direction perpendicular to the surface of the side wall and the two other lateral directions can be increased, the laterals directions spanning the plane of the surface of the side walls. As a result, the connection arrangement become more stable and robust.

Also disclosed herein is a method for producing a connection arrangement and for mounting a connection between a leaf spring and a control arm. In this case, the connection arrangement has a connector, a leaf spring connection portion and a control arm connection portion and is vulcanized for fully or partially positive-locking and/or firmly bonded, in particular non-detachable enclosing and/or engaging around the leaf spring connection portion and the one or more control arm connection portions. Alternatively, for mounting the connection, the connector is vulcanized for fully or partially positive-locking and/or firmly bonded, in particular non-detachable enclosing and/or encompassing the leaf spring connection portion and the one or more control arm connection portions.

An exemplary method for producing a connection arrangement between a leaf spring connection portion of a leaf spring and one or more control arm connection portions of a control arm and/or for mounting a connection between the leaf spring and the control arm with formation of a connector composed of a vulcanized material, preferably rubber (or other elastomer), typically has the following steps:

providing a connector blank composed of a vulcanizable material, for example, rubber (or other elastomer), wherein the connector blank is formed with cavities which are suitable for receiving the leaf spring connection portion and the one or more control arm connection portions, arranging the leaf spring, the control arm(s) and the connector in the positions provided to one another, in particular at least the connector being arranged within a vulcanization tool, performing a vulcanization, wherein increased pressure and/or increased temperature act(s) upon the connector for formation of a positive-locking and/or firmly bonded connection, for example, of an adhesive adhesion connection, to the leaf spring connection portion and the one or more control arm connection portions. Vulcanization methods known from the prior art are carried out, for example, at temperatures of 120° C. to 160° C.

The production of the connection arrangement therefore occurs in one main working step. While the connector obtains its final contour, the positive-locking and/or non-detachable connection are simultaneously formed. The finished connection arranged can be substantially removed from the vulcanization tool after vulcanization.

Further advantageous configurations of the invention are disclosed in the following description of the figures. In the figures:

BRIEF DESCRIPTION OF THE DRAWINGS

FIG. 3 shows a schematic sectional representation through line of intersection A-A (see FIG. 2) of the exemplary embodiment of a connection arrangement according to the invention according to FIG. 1.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In the various figures, the same parts are always provided with the same reference numbers, which is why these are generally also only described once. It should furthermore be pointed out that the plotted auxiliary lines, which are not, however, provided with reference numbers, serve the purpose of clarity, but the invention should in no way be restricted to exclusively or primarily symmetrical embodiments.

Figure 1:
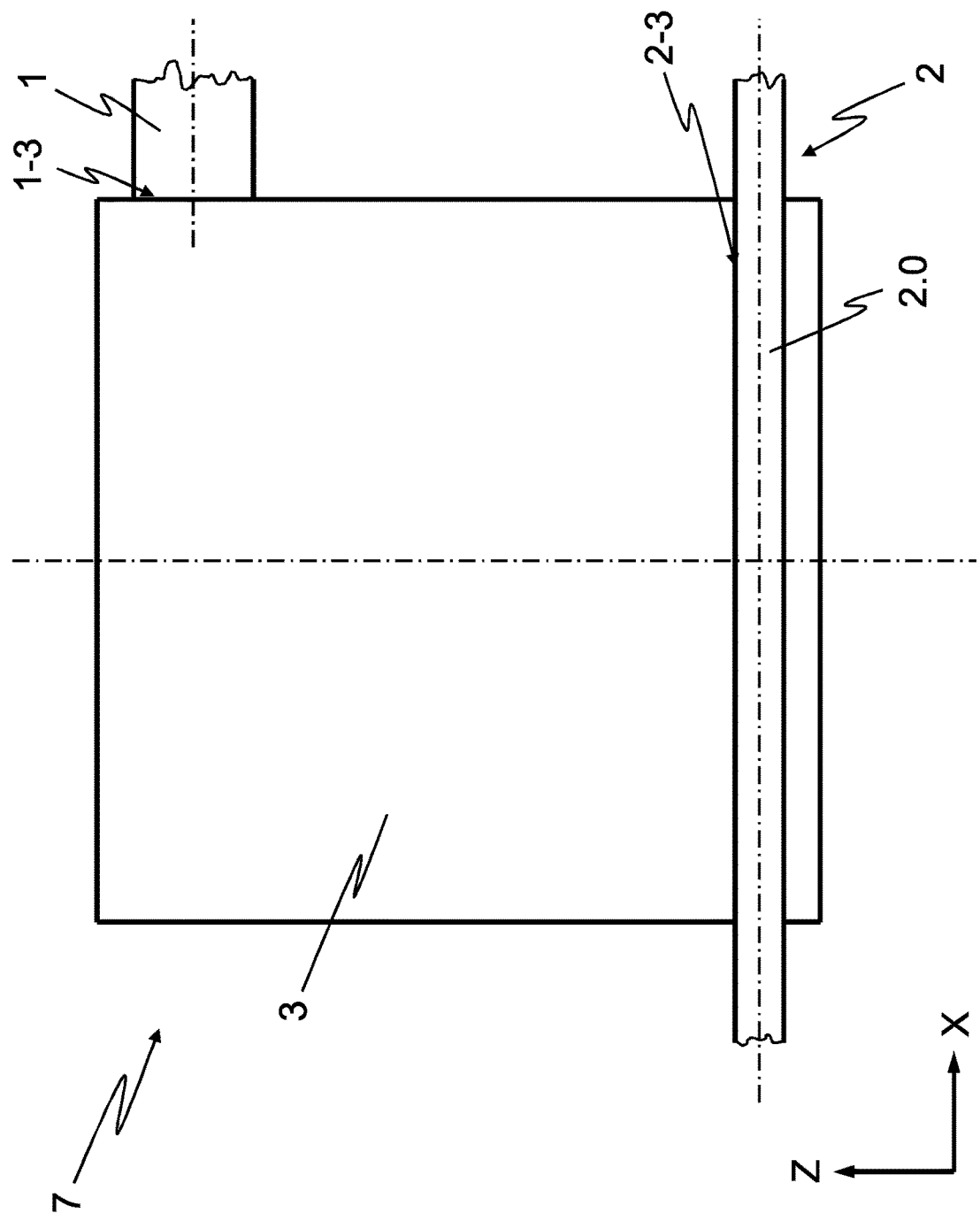
FIG. 1 shows a schematic side view of an exemplary embodiment of a connection arrangement according to the invention.

FIG. 1 shows, in a highly simplified and schematic manner, a connection arrangement 7, not represented true-to-scale, which has a leaf spring 1, a control arm 2, and a connector 3 joining leaf spring 1 and control arm 2 to one another in a non-detachable connection, in particular in a positive-locking and/or firmly bonded manner.

Leaf spring 1 has a longitudinally formed base body, only a portion of which is shown, and which extends according to the illustrated coordinate system along an X-direction. Leaf spring 1 furthermore has a leaf spring connection portion 1.1 (see FIG. 3) which is formed here as a terminal or end portion of the spring and is fully enclosed or surrounded by connector 3. The surface or outer contour of leaf spring connection portion 1.1 (see FIG. 3) forms a leaf spring contact region 1-3 which is enclosed and/or surrounded and/or covered by connector 3 in a positive-locking manner.

Figure 2:
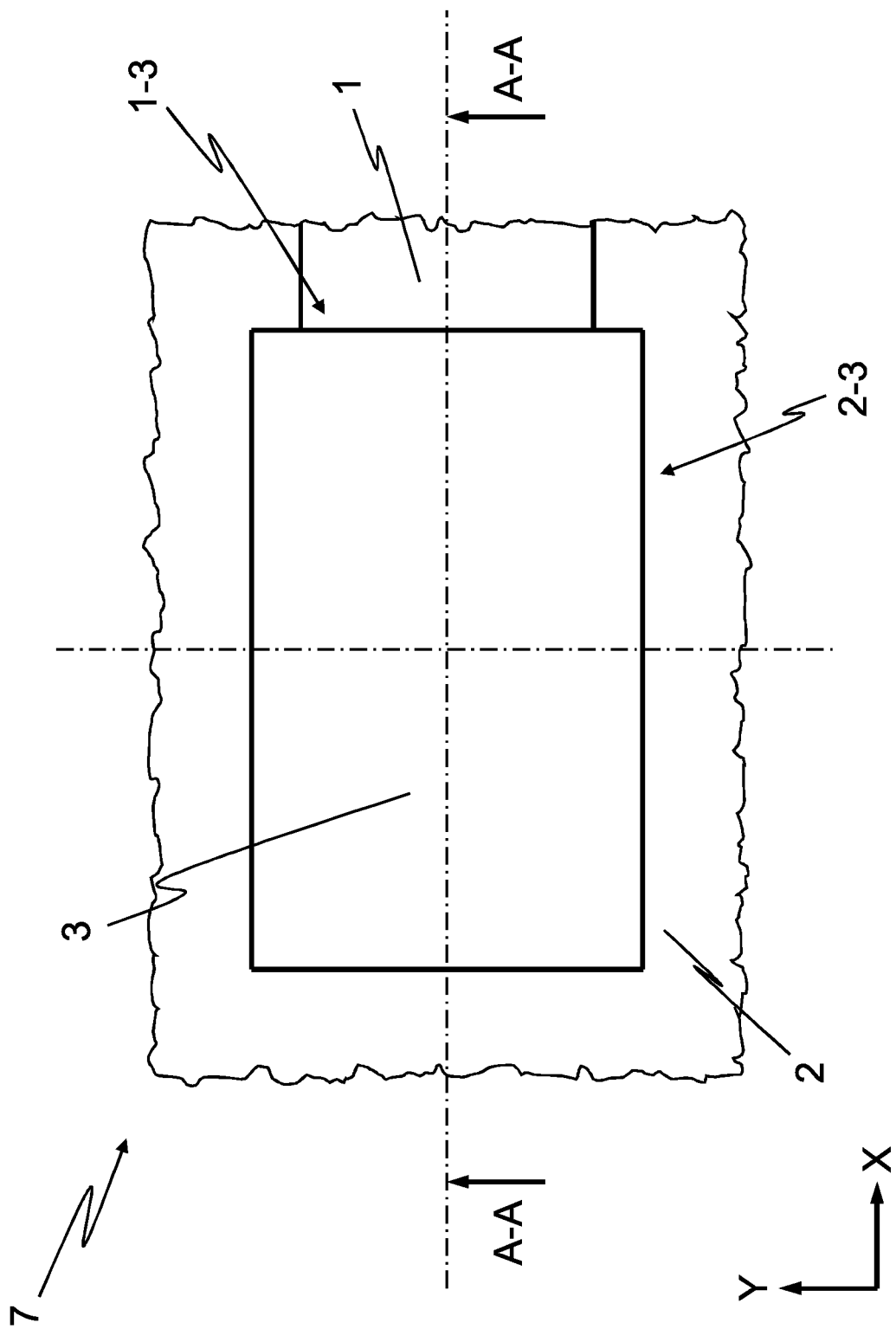
FIG. 2 shows a schematic top view of the exemplary embodiment of a connection arrangement according to the invention according to FIG. 1.

Control arm 2, which is illustrated in a highly simplified form and which has a substantially flat, preferably flat connection portion 2.0, is arranged spaced apart from leaf spring 1, according to the represented coordinate system in the Z-direction, the substantially flat surface lying in a plane which is spanned by the X-direction and the Y-direction (see FIG. 2). The surface or the outer contour of control arm connection portion 2.0 forms a control arm contact region 2-3 which is enclosed and/or surrounded and/or covered by connector 3 in a positive-locking manner. The surface or the outer contour in control arm contact region 2-3 can additionally be formed or prepared for a non-detachable, in particular positive-locking and/or firmly bonded connection.

FIG. 2 shows connection arrangement 7, having leaf spring 1, control arm 2 and connector 3 in a top view, leaf spring contact region 1-3 between leaf spring 1 and connector 3 and control arm contact region 2-3 between control arm 2 and connector 3 being indicated. Line of intersection A-A (see FIG. 3) is furthermore plotted as the axis of symmetry in relation to the Y-direction of connector 3.

FIG. 3 shows a sectional representation along line A-A of FIG. 2 of connection arrangement 7, having a leaf spring 1, a control arm 2 and a connector 3. Leaf spring 1 furthermore has a leaf spring connection portion 1.1 which is formed here as a terminal portion and is fully enclosed or surrounded fully by connector 3. The surface or outer contour of leaf spring connection portion 1.1 is enclosed and/or surrounded and/or covered along leaf spring contact region 1-3 by connector 3 by means of a blind hole-type cavity 3.1 in a positive-locking and/or firmly bonded manner. The surface or the outer contour of control arm connection portion 2.0 forms a control arm contact region 2-3 which has, here, a total of six through holes 2.1, 2.2, 2.3, 2.4, 2.5 and 2.6 and, where applicable, further other cavities, not represented. Connector 3 penetrates through said through holes 2.1-2.6, i.e. they are filled by the elastomer material or the elastomer matrix. A non-destruction-free detachable connection is generated between connector 3 and control arm 2 as a result of this grid-type/matrix-type connection.

A first stiffener 4, a second stiffener 5 and a third stiffener 6 are embedded in the connector 3 and are arranged between leaf spring 1 and control arm 2 in the Z-direction. Stiffeners 4-6 may advantageously be formed as flat metal plates. Stiffeners 4-6 are arranged and aligned with their lateral surfaces perpendicular to the Z-direction spaced apart from one another and spaced apart from leaf spring 1 and/or control arm 2. Moreover, stiffeners 4-6 are encased fully by the matrix or the material of connector 3. The stiffness in the Z-direction is increased by stiffeners 4-6. In particular, as a result of this, the stiffness in the Z-direction is increased in comparison with the stiffness in the X-direction and Y-direction. As a result, the ratio of the perpendicular stiffness in the Z-direction to the lateral stiffness in the X-direction and Y-direction is increased. For adjustment of a desired stiffness of connector 3, the number, the form, in particular the strength of flat stiffeners 4-6 as well as the alignment of stiffeners 4-6 with respect to the X-, Y- and/or Z-direction(s) may be varied.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A motor vehicle suspension comprising:
   a leaf spring;
   a control arm;
   a connector formed of an elastomer and having a first cavity receiving a portion of the leaf spring and a second cavity receiving a portion of the control arm, the connector bonded to the leaf spring and to the control arm by vulcanization; and
   at least one stiffener embedded within the connector and comprising two plates arranged substantially parallel to one another and substantially parallel to a surface of the portion of the control arm received by the second cavity.

2. The motor vehicle suspension of claim 1, wherein the connector is a monolithic piece of elastomer.

3. The motor vehicle suspension of claim 1, wherein the first cavity is a blind hole and the portion of the leaf spring received therein is an end of the leaf spring.

4. The motor vehicle suspension of claim 1, wherein the control arm has at least one hole formed therein, the connector extending therethrough.

5. The motor vehicle suspension of claim 4, wherein the at least one hole is formed in a flat connection portion of the control arm.

6. The motor vehicle suspension of claim 1, wherein at least one of the plates is a metal plate.

7. A motor vehicle suspension comprising:
   a connector formed of an elastomer and having a first cavity and a second cavity formed therein;
   a leaf spring having an end portion retained in the first cavity and extending therefrom, the end portion bonded to the connector by vulcanization;
   a control arm having a portion retained in the second cavity and bonded to the connector by vulcanization, the control arm extending from the connector; and
   at least one stiffener embedded within the connector and comprising two plates arranged substantially parallel to one another and substantially parallel to a surface of the portion of the control arm received by the second cavity.

8. The motor vehicle suspension of claim 7, wherein the first cavity is a blind hole.

9. The motor vehicle suspension of claim 7, wherein the control arm has at least one hole formed therein, the connector extending therethrough.

10. The motor vehicle suspension of claim 9, wherein the at least one hole is formed in a flat connection portion of the control arm.

11. The motor vehicle suspension of claim 7, wherein at least one of the two plates is a metal plate.

12. A motor vehicle suspension comprising:
    a leaf spring;
    a control arm having at least one hole formed therethrough;
    a connector formed of an elastomer and having a blind-hole cavity receiving an end of the leaf spring and a through-hole cavity through which the control arm extends, the connector extending through the at least one hole formed through the control arm, the connector bonded to the leaf spring and to the control arm by vulcanization; and
    at least two stiffener plates arranged substantially parallel to one another and substantially parallel to a surface of a portion of the control arm received by the through-hole cavity.

13. The motor vehicle suspension of claim 12, wherein the connector is a monolithic piece of elastomer.

14. The motor vehicle suspension of claim 12, wherein the at least one hole is formed in a flat connection portion of the control arm.

* * * * *